United States Patent [19]

Doan

[11] 4,391,433
[45] Jul. 5, 1983

[54] EXTENDABLE TORCH GUIDE

[76] Inventor: Robert L. Doan, 10362 Vic Pl., Garden Grove, Calif. 92642

[21] Appl. No.: 386,954

[22] Filed: Jun. 10, 1982

[51] Int. Cl.³ .............................................. B23K 7/10
[52] U.S. Cl. .................................................... 266/77
[58] Field of Search ....................... 266/77, 48, 58, 66, 266/76

[56] References Cited

U.S. PATENT DOCUMENTS 4,273,313  6/1981  DeNardo ............................. 266/66
4,346,873  8/1982  Domres ................................ 266/77

Primary Examiner—W. Stallard
Attorney, Agent, or Firm—Philip M. Hinderstein

[57] ABSTRACT

A torch guide for use in cutting metal plate. The guide includes a base member which has a longitudinal channel therein and a magnet on one side thereof for removable attachment of the base member to a metal plate. An elongate straight edge is at least partially mounted within the channel in the base member for slidable movement relative thereto, the ends of the straight edge extending beyond the ends of the base member. A plurality of thumb wheels mounted in the base member lock the straight edge relative to the base member to prevent relative movement therebetween. An end support member is connectable to either end of the straight edge, the end support member also having a magnet on one side thereof for permitting removable attachment thereof to the metal plate. A torch tip holder slidably engages the straight edge for maintaining the torch tip at a uniform distance and at a preselected angle relative to the metal plate.

17 Claims, 4 Drawing Figures

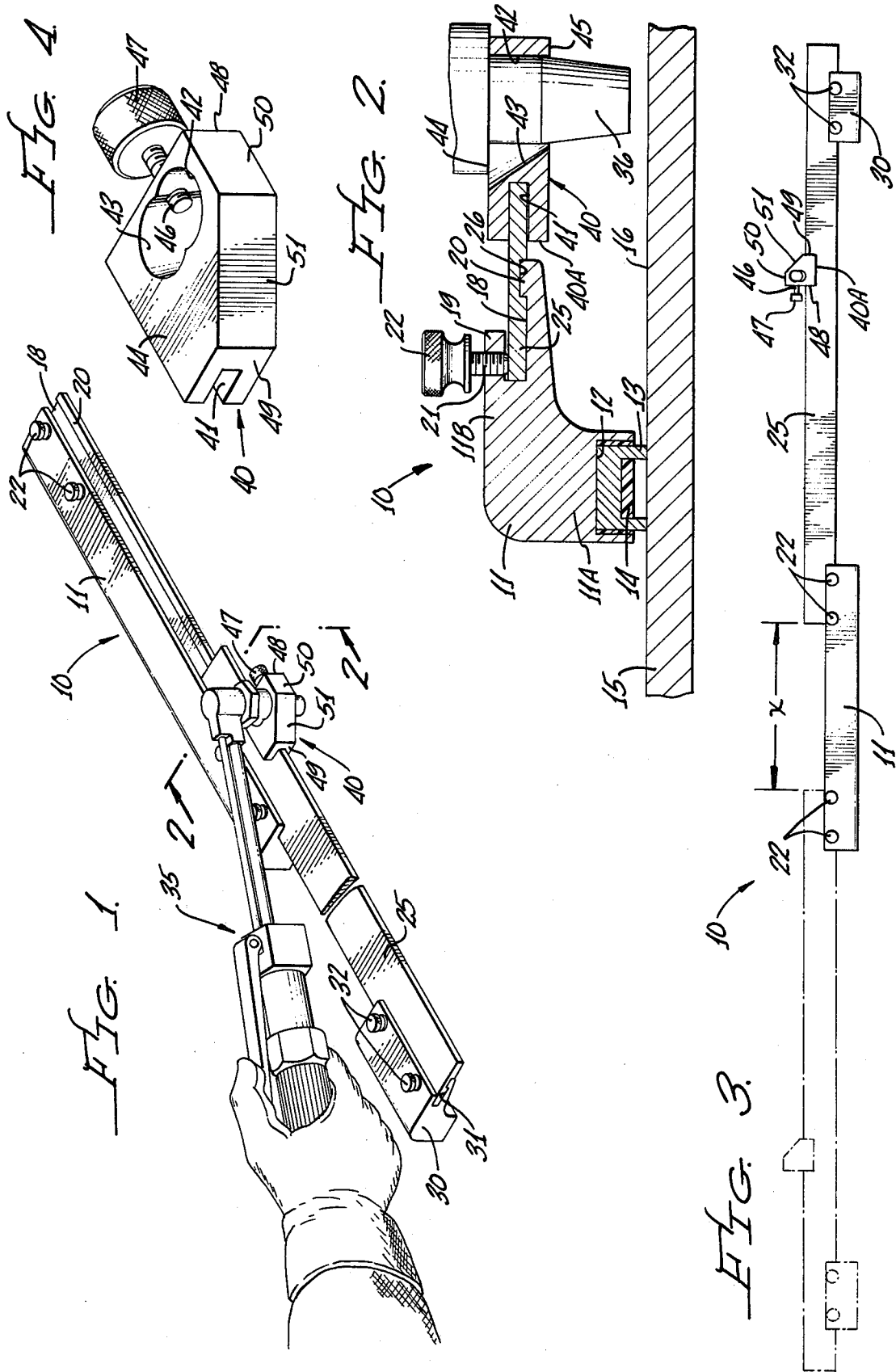

EXTENDABLE TORCH GUIDE

BACKGROUND OF THE INVENTION

1. Field of the Invention

The present invention relates to an extendable torch guide and, more particularly, to a torch guide including an extendable cutting rail and a slidable torch tip holder for use in the cutting of structural and plate steel.

2. Description of the Prior Art

Structural and plate steel typically comes in large sheets which must be cut for use in the fabrication of structural members. Cutting is typically done with a torch in a large fabrication shop. The cutting torches are typically controlled by automatic or semiautomatic cutting equipment which insures that cuts are made on a straight line and with the torch tip maintained at a desired angle and distance from the metal plate.

On the other hand, small fabrication shops often do not have this sophisticated cutting equipment and metal plate cutting must be performed by hand. Furthermore, cutting is often done in the field, at a work site, or for repairs, where sophisticated cutting equipment is unavailable.

In cutting metal plates with a cutting torch, several requirements exist. Initially, it is necessary that cuts be made as straight as possible. Secondly, it is necessary that a cut be as consistent as possible, with the torch tip being maintained at a fixed distance from the metal plate. One of the most difficult requirements is the necessity for cutting at an angle, typically 37½°, the standard bevel used when preparing a metal plate for subsequent welding, although other angles up to 60° are also used, depending on the thickness of the metal plate.

In an attempt to satisfy the above requirements, a variety of torch guides have been provided. A typical torch guide includes an elongate cutting rail or straight edge having a plurality of magnets attached thereto so that the straight edge can be attached to a metal plate. The straight edge provides a guide for making a straight cut.

Several problems are encountered in the use of such a torch guide. First of all, the torch guide typically has a fixed length and, therefore, can only be used to make a continuous cut having such a length. If a longer cut is necessary, the torch guide must either be moved or extension members attached thereto. The former approach is undesirable because of the necessity of accurately aligning the new position of the straight edge with the old position thereof, and the latter is undesirable because of the necessity of carrying additional, separate parts.

Secondly, even with such a torch guide, there is no guarantee that an even, consistent cut will be made because the guide relies on the skill of the operator in maintaining the torch tip at a fixed distance from the metal plate. An additional means, as well as the skill of the operator, is also required when making a beveled cut in preparing a metal plate for a subsequent welding operation.

SUMMARY OF THE INVENTION

According to the present invention, these problems are solved by the provision of an extendable torch guide for use in cutting metal plate including a slidable torch tip holder. The present torch guide includes a cutting rail or straight edge, but the present torch guide can be used to make a continuous cut for a distance which is more than twice as great as the length of the straight edge. With the present torch guide, an even, consistent cut is guaranteed by the provision of a slidable means for holding the torch tip and maintaining it at a predetermined distance from the metal plate. Furthermore, the tip holding means will support the torch tip perpendicular to the work piece or at a 37½° to 60° angle relative thereto.

Briefly, the present guide for a torch for use in cutting metal plate comprises a base member, the base member having a longitudinal channel therein and an elongate magnet on one side thereof for removable attachment of the base member to a metal plate; an elongate straight edge at least partially mounted within the channel in the base member for slidable movement relative thereto, the ends of the straight edge being extendable beyond the ends of the base member; a plurality of thumb wheels mounted in the base member for locking the straight edge relative to the base member to prevent relative movement therebetween; an end support member connectable to either end of the straight edge, the end support member also having an elongate magnet on one side thereof for permitting removable attachment thereof to the metal plate; and a torch tip holder slidably engaging the straight edge for maintaining the torch tip at a uniform distance and at a preselected angle relative to the metal plate.

OBJECTS, FEATURES AND ADVANTAGES

It is therefore the object of the present invention to solve the problems encountered heretofore in making a straight, even, consistent cut in a metal plate. It is a feature of the present invention to solve these problems by the provision of an extendable torch guide. An advantage to be derived is a torch guide which eliminates uneven cuts on structural and plate steel. A further advantage is a torch guide which eliminates the necessity of buying extra attachments. A still further advantage is a torch guide which permits the making of a straight cut for a length more than twice as great as the length of the torch guide. Another advantage is a torch guide which saves set up time.

It is another feature of the present invention to solve these problems by the provision of a torch guide with a slidable torch tip holder which keeps the torch tip at a desired distance and at a desired angle to the workpiece. An advantage to be derived is an even cut on structural and plate steel. A further advantage is a consistent cut. A still further advantage is the ability to make an accurate beveled cut.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective view of the present extendable torch guide and torch tip holder showing the use thereof in cutting structural or plate steel;

FIG. 2 is an enlarged sectional view taken along the line 2—2 in FIG. 1;

FIG. 3 is a top plan view of the torch guide of FIG. 1 showing its extendable nature; and FIG. 4 is an enlarged perspective view of the torch tip holder.

DESCRIPTION OF THE PREFERRED EMBODIMENT

Referring now to the drawings, the present torch guide, generally designated 10, includes an elongate base member 11 having a generally L-shaped cross section (see FIG. 2). The end of one leg 11A of base member 11 has at least one elongate slot 12 therein for receipt of an elongate magnet 13. Magnet 13 may have any suitable shape and configuration, and may be secured in slot 12 with a suitable epoxy or other adhesive 14. In any event, magnet 13 permits base member 11 to be removably attached to one surface 16 of a metal plate 15. When so positioned, the other leg 11B of base member 11 is positioned in parallel, spaced relation to surface 16 of plate 15.

The end of leg 11B of base member 11 has a longitudinal channel 18 therein which is open at both ends of base member 11. Leg 11B incorporates a first longitudinal lip 19 which extends parallel to surface 16 and partially encloses the top of channel 18. Base member 18 also includes a second longitudinal lip 20 which extends perpendicular to surface 16 and partially encloses the end of channel 18. A pair of screws 21 incorporating thumb wheels 22 extend through lip 19, into channel 18, at parallel, spaced locations, at the opposite ends of base member 11 (see FIGS. 1 and 3).

Torch guide 10 also comprises an elongate cutting rail or straight edge 25. Straight edge 25 has a length which is significantly longer than the length of base member 11 and has a generally rectangular cross section. The height of straight edge 25 is slightly less than the depth of channel 18 whereby one side of straight edge 25 is positionable within channel 18 for slidable movement relative thereto. Straight edge 25 has a groove 26 in the bottom surface thereof for receipt of lip 20. The dimensions and position of groove 26 are such as to matingly receive lip 20, as shown most clearly in FIG. 2. Thus, lips 19 and 20 of base member 11 support straight edge 25 for slidable movement relative thereto.

As should be evident from an inspection of FIG. 2, thumb wheels 22 may be manipulated to bring screws 21 into contact with the upper surface of straight edge 25. Thus, screws/thumb wheels 21, 22 function as a locking means for fixing the position of straight edge 25 relative to base member 11 to prevent relative movement therebetween.

In operation of that portion of torch guide 10 described hereinabove, it is seen that straight edge 25 is slidable relative to base member 11 from a first position, shown in solid lines in FIG. 3, to a second position, shown in phantom in FIG. 3. In this manner, straight edge 25 may be used to make a straight cut in plate 15, without moving base member 11, over a distance equal to twice the length of straight edge 25, plus the distance "X" (see FIG. 3). X represents the distance between the opposite ends of straight edge 25 in its maximum extended positions, which are the positions which permit both pairs of screws 21 at each end of base member 11 to engage straight edge 25.

If a long cut is to be made, straight edge 25 can be positioned as shown in solid lines in FIG. 3 and the first section of the cut made. Thumb wheels 22 can then be loosened and straight edge 25 repositioned to a more central location to continue the cut. Eventually, straight edge 25 can be repositioned to the position shown in phantom in FIG. 3 to complete the cut. All during repositioning of straight edge 25, base member 11 will maintain its position to insure an even cut.

It should be evident from an inspection of FIG. 3 that the free end of straight edge 25 requires support when it is substantially extended beyond the ends of base member 11. This is provided by a single end support member 30. End support member 30 has the exact same construction as base member 11, except that the length thereof is substantially smaller. Accordingly, the construction of end support member 30 will not be described in detail. Suffice it to say that end support member 30 includes a channel 31 in which straight edge 25 is partially mounted for slidable movement and a pair of thumb wheels 32 for locking straight edge 25 relative to end support member 30 to prevent relative movement therebetween.

With thumb wheels 32 loosened, end support member 30 can be slid onto either end of straight edge 25 and locked thereto. When moving straight edge 25 from the position shown in solid lines in FIG. 3 to the position shown in phantom in FIG. 3, thumb wheels 32 may be loosened, end support member 30 removed from one end of straight edge 25, slid onto the other end of straight edge 25, and thumb wheels 32 retightened. Although not shown, end support member 30 includes a magnet similar to magnet 13 for permitting removable attachment thereof to metal plate 15. Thus, end support member 30 supports the free end of straight edge 25 when in its extended position. With adequate rigidity of straight edge 25, it will be apparent that end support member 30 may not be necessary when straight edge 25 is centered relative to base member 11.

Torch guide 10 also includes a torch tip holder, generally designated 40, torch tip holder 40 slidably engaging straight edge 25 and supporting the tip 36 of a cutting torch 35 for insuring an even, consistent cut. Torch tip holder 40 is a generally square member having a rectangular cross section, the thickness of torch tip holder 40 being approximately three times the thickness of straight edge 25. One side 40A of torch tip holder 40 has an elongate slot 41 extending entirely therethrough, slot 41 having any desired depth and a thickness which is slightly greater than the thickness of straight edge 25. Thus, the outer side of straight edge 25 is adapted to extend into slot 41.

Torch tip holder 40 also has a pair of overlapping holes 42 and 43 extending laterally therethrough. Hole 42 is perpendicular to the upper and lower surfaces 44 and 45, respectively, of holder 40 whereas hole 43 is positioned at any desired angle, such as $37\frac{1}{2}°$, relative to hole 42. As seen most clearly in FIG. 4, each of holes 42 and 43 has a perimeter at upper surface 44 which is somewhat greater than 180°. Furthermore, the diameters of holes 42 and 43 are equal and slightly greater than the diameter of the standard size tip 36 of a conventional cutting torch 35. Thus, as shown in FIGS. 1 and 2, tip 36 of a cutting torch 35 may be positioned in either one of holes 42 and 43. A screw 46 having a thumb wheel 47 at one end thereof extends through a threaded hole in one side of holder 40, at the intersection between holes 42 and 43. Thus, screw 46 may be used to lock tip 36 in either hole 42 or 43.

It should further be noted that the axes of holes 42 and 43 are in a plane which is perpendicular to surface 44 and slot 41 and which is not centrally positioned relative to opposed sides 48 and 49 of holder 40. In fact, holes 42 and 43 are positioned much closer to side 48 than side 49. Furthermore, the corner at the intersection between side 49 and the remaining side 50 is cut away, as shown at 51, for reasons which will appear more fully hereinafter.

The operation of torch tip holder 40 should be apparent from an examination of FIGS. 1 and 2. Initially, a welder may position tip 36 of a cutting torch 35 into either hole 42 or hole 43, depending on whether a straight or beveled cut is required. A simple tightening of thumb wheel 47 will lock tip 36 in place. Torch 35 may now be manipulated to position holder 40 until straight edge 25 extends into slot 41 therein. Torch 35 would be held at an acute angle relative to straight edge 25 and holder 40 will then freely slide along straight edge 25 during the cutting operation. By positioning cutting torch 35 at an acute angle relative to straight edge 25, a force will be placed on holder 40 in the direction of straight edge 25 to maintain straight edge 25 firmly seated in slot 41. Thus, there is no necessity to attach holder 40 in any way to straight edge 25. Furthermore, by placing holes 42 and 43 adjacent side 48 of holder 40, tip 36 of torch 35 literally pushes holder 40 rather than pulling same, which eliminates any tendency for holder 40 to rotate about an axis perpendicular to surface 44. Finally, by providing cutaway 51, the welder can clearly see tip 36 below holder 40 and the cutting action which results.

The operation and use of torch guide 10 should now be apparent. Torch guide 10 permits unsurpassed smoothness of operation in the cutting of structural and plate steel. Torch guide 10 may be made from a hard, anodized material with strong holding magnets and a solid brass cutting rail 25 that extends on opposite sides of base member 11 to allow maximum cutting distance with a minimum amount of overall length. The easily used sliding torch tip holder 40 keeps torch tip 36 at a desired distance from surface 16 of plate 15.

Torch guide 10 may be used by anyone who uses a cutting torch and may be used as a guide for cutting steel plate as straight as possible. Guide 10 eliminates uneven cuts and the necessity of buying extra attachments. Tip holder 40 insures consistent cuts time after time. Guide 10 saves set-up time and eliminates the frustration caused by previous manual operations.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A guide for a torch for use in cutting metal plate comprising:
   a base member, said base member having a longtudinal channel therein and magnetic means on one side thereof for removably attaching said base member to a metal plate;
   an elongate cutting rail at least partially mounted within said channel in said base member for slidable movement relative thereto, the ends of said cutting rail being extendable beyond the ends of said base member;
   means for locking said cutting rail relative to said base member to prevent relative movement therebetween; and
   an end support member connectable to said ends of said cutting rail, said end support member having magnetic means on one side thereof for removable attachment thereof to said metal plate.

2. A torch guide according to claim 1, wherein said cutting rail has a groove in one side thereof and said base member has a lip extendable into said groove in said cutting rail for maintaining the lateral position of said cutting rail relative to said base member.

3. A torch guide according to claim 1, wherein said locking means comprises:
   a plurality of thumb wheel screws extending through said base member into said longitudinal channel for engaging a surface of said cutting rail.

4. A torch guide according to claim 1, wherein said end support member is connectable to either end of said cutting rail.

5. A torch guide according to claim 4, further comprising:
   means for locking said cutting rail relative to said end support member to prevent disconnection thereof.

6. A torch guide according to claims 1, 2, 3, 4 or 5, further comprising:
   torch tip holding means slidably engaging said cutting rail for guiding the tip of a cutting torch relative to said cutting rail.

7. A torch guide according to claim 6, wherein said torch tip holding means is a generally rectangular member having a slot in one side thereof for receipt of an edge of said cutting rail.

8. A torch guide according to claim 7, wherein said torch tip holding means has at least one hole extending laterally therethrough, perpendicular to said slot in said one side thereof, for receipt of said cutting torch tip.

9. A torch guide according to claim 8, wherein said torch tip holding means further comprises:
   means for locking said cutting torch tip in said hole therein.

10. A torch guide according to claim 8, wherein said torch tip holding means has a pair of overlapping holes extending therethrough, one of said holes being parallel to said one side thereof, the axis of the other hole being at an acute angle relative to the axis of said one hole.

11. A torch guide according to claim 10, wherein said torch tip holding means further comprises:
   means for locking said cutting torch tip in either of said holes in said torch tip holding means.

12. A guide for a torch for use in cutting metal plate comprising:
   a base member, said base member having a longitudinal channel therein and magnetic means on one side thereof for removably attaching said base member to a metal plate;
   an elongate cutting rail at least partially mounted within said channel in said base member for slidable movement relative thereto, the ends of said cutting rail being extendable beyond the ends of said base member;
   means for locking said cutting rail relative to said base member to prevent relative movement therebetween; and
   torch tip holding means slidably engaging said cutting rail for guiding the tip of a cutting torch relative to said cutting rail.

13. A torch guide according to claim 12, wherein said torch tip holding means is a generally rectangular member having a slot in one side thereof for receipt of an edge of said cutting rail.

14. A torch guide according to claim 13, wherein said torch tip holding means has at least one hole extending laterally therethrough, perpendicular to said slot in said one side thereof, for receipt of said cutting torch tip.

15. A torch guide according to claim 14, wherein said torch tip holding means further comprises:

means for locking said cutting torch tip in said hole therein.

16. A torch guide according to claim 14, wherein said torch tip holding means has a pair of overlapping holes extending therethrough, one of said holes being parallel to said one side thereof, the axis of the other hole being at an acute angle relative to the axis of said one hole.

17. A torch guide according to claim 16, wherein said torch tip holding means further comprises:

means for locking said cutting torch tip in either of said holes in said torch tip holding means.

* * * * *